United States Patent [19]

Vajda et al.

[11] Patent Number: 5,346,525

[45] Date of Patent: Sep. 13, 1994

[54] TAKE OUT DEVICE

[75] Inventors: Vladimir Vajda, Nussbaumen; Horst W. Müller, Diessenhofen/TG, both of Switzerland

[73] Assignee: Emhart Glass Machinery Investments Inc., Wilmington, Del.

[21] Appl. No.: 3,546

[22] Filed: Jan. 13, 1993

[30] Foreign Application Priority Data

Jan. 23, 1992 [GB] United Kingdom ............... 9201401.8

[51] Int. Cl.⁵ ............................................. C03B 9/44
[52] U.S. Cl. ........................................ 65/260; 65/239; 65/241; 414/733
[58] Field of Search ............ 65/260, 239, 241; 414/733; 294/87.26, 87.1

[56] References Cited

U.S. PATENT DOCUMENTS 4,241,009 12/1980 Sokolow ............................. 264/532

FOREIGN PATENT DOCUMENTS 0455331 11/1991 European Pat. Off. .

Primary Examiner—W. Gary Jones
Assistant Examiner—Steven P. Griffin
Attorney, Agent, or Firm—Spencer T. Smith

[57] ABSTRACT

A take out device for a multi gob glassware forming machine comprises at least two take out tongs and adjusting means to alter the spacing of the tongs as the take out device moves from its pick up position to its deposit position. The adjusting means comprises a gear segment which is caused to rotate as the take out arm moves and, through a link, causes appropriate movement of a tong.

4 Claims, 3 Drawing Sheets

TAKE OUT DEVICE

BACKGROUND TO THE INVENTION

In a conventional type of glassware forming machine known as an 'I.S. machine', several identical sections, usually eight to ten, but sometimes as many as 16, are mounted side by side and operate, cyclically but in off set timed relationship, to make glass containers. Each section normally contains more than one mould for the making of such containers; usually two or three but increasingly commonly four: the machines are consequently described as double-, triple- or quadruple- gob machines. In the operation of each section the requisite number of gobs of molten glass are provided to a set of parison moulds, in each of which a parison is formed, and the set of parisons is transferred to a set of blow moulds in which they are blown to the required shape. When the containers have been formed they are removed from the blow moulds by a take out device, which picks up the containers and transfers them, usually to a dead plate on which they are cooled, and from which they are pushed out onto a conveyor.

A typical take out device is shown in GB 1274730. This shows a take out device, for use with a double gob glassware forming machine, comprising two take out tongs, a support for the take out tongs and mechanism arranged to move the support to carry the tongs between a pick up position in which the tongs may pick up moulded glass articles from the moulds of the machine and a deposit position in which the tongs may deposit the glass articles for example at a cooling station or dead plate.

It will be understood that when such a take out device is in use, the spacing of the take out tongs is determined by the spacing of the moulds, and thus the spacing of the moulds determines the spacing of the moulded articles on the dead plate. Conventional push out mechanisms pushing the moulded articles onto a conveyor from the dead plate may, by appropriate spacing of the pusher fingers, alter the spacing of the moulded articles on the conveyor from that on the dead plate, but the amount by which this can be done is severely restricted by the size and spacing of the containers and the need to position the fingers between the containers; this constraint is greater in a three or four gob machine than with a double gob machine. Also if an attempt is made to make a substantial change to the spacing, one at least of the pusher fingers will necessarily be moving quite fast when it first contacts the appropriate container, thus risking damaging the container.

With increasing use of multi gob machines and efforts to increase the rate of operation of the glassware forming machines, conveyor speeds also have to increase; it is however desirable to have the conveyor speed as low as possible, partly for economy of operation, but also because with increasing conveyor speeds problems of instability of containers on the conveyor increase. For this reason it is often desirable to obtain a spacing of containers on the conveyor which is less than the spacing of the moulds.

With certain machines, the widths of a section of the machine is in fact greater than the distance necessary to accommodate the containers removed from the section. In these cases it is sometimes desirable to ensure that the containers are placed on the conveyor with a spacing which is more than that between the spacing of the moulds, to ensure that the containers on the conveyor are all equally spaced, thus to provide for uniformity of conditions of the containers on the conveyor and for ease of handling in subsequent operations.

In EPA-0455331, a take out device for use with a multi gob glassware forming machine is described which comprises at least two take out tongs, a support for the tongs, mechanism arranged to move the tongs between a pick up position, in which the tongs may pick up moulded glass articles from moulds of the machine and a deposit position in which the tongs may deposit the glass articles, for example onto a dead plate, where at least one of the tongs is movably mounted on the support and moving mechanism is provided to move such movable tong between a spacing from its adjacent tong appropriate to the spacing of the moulds when the tongs are in the pick up position to a different spacing when the tongs are in a deposit position. The moving mechanism comprises a pneumatically operated piston and cylinder device. While such a device may operate satisfactorily, it is somewhat expensive in construction.

It is one of the objects of the present invention to provide an improved take out device for use with a multi-gob glassware forming machine which enables the spacing of containers of the conveyor to be varied from the spacing of the containers in the moulds of the machine.

BRIEF STATEMENT OF THE INVENTION

The present invention provides a take out device for use with a multi gob glassware forming machine comprising at least two take out tongs a support on which the take out tongs are supported, at least one of the tongs being slidably mounted on the support an arm on which the support is mounted mechanism arranged to move the arm through about 180° to carry the tongs between a pick up position in which the tongs may pick up moulded glass articles and a deposit position in which the tongs may deposit the articles moving mechanism arranged to move the slidable tong between one spacing from its adjacent tong when the tongs are in the pick up position and a different spacing when the tongs are in the deposit position said moving mechanism comprising a gear segment pivotally mounted on the support a pinion fixed in the arm and in engagement with the gear segment a link extending between the gear segment and the movable tong so that on movement of the arm to carry the tongs between the pick up and deposit positions, the pinion causes the gear segment to rotate about its pivot and the link causes sliding movement of the movable tong on the support.

A preferred embodiment of the present invention will now be described with reference to the accompanying drawings in which FIG. 1 shows a take out device according to the invention in its pick up position in which it has just picked up three containers from their blow moulds;

DETAILED DESCRIPTION OF THE INVENTION

Figure 1:
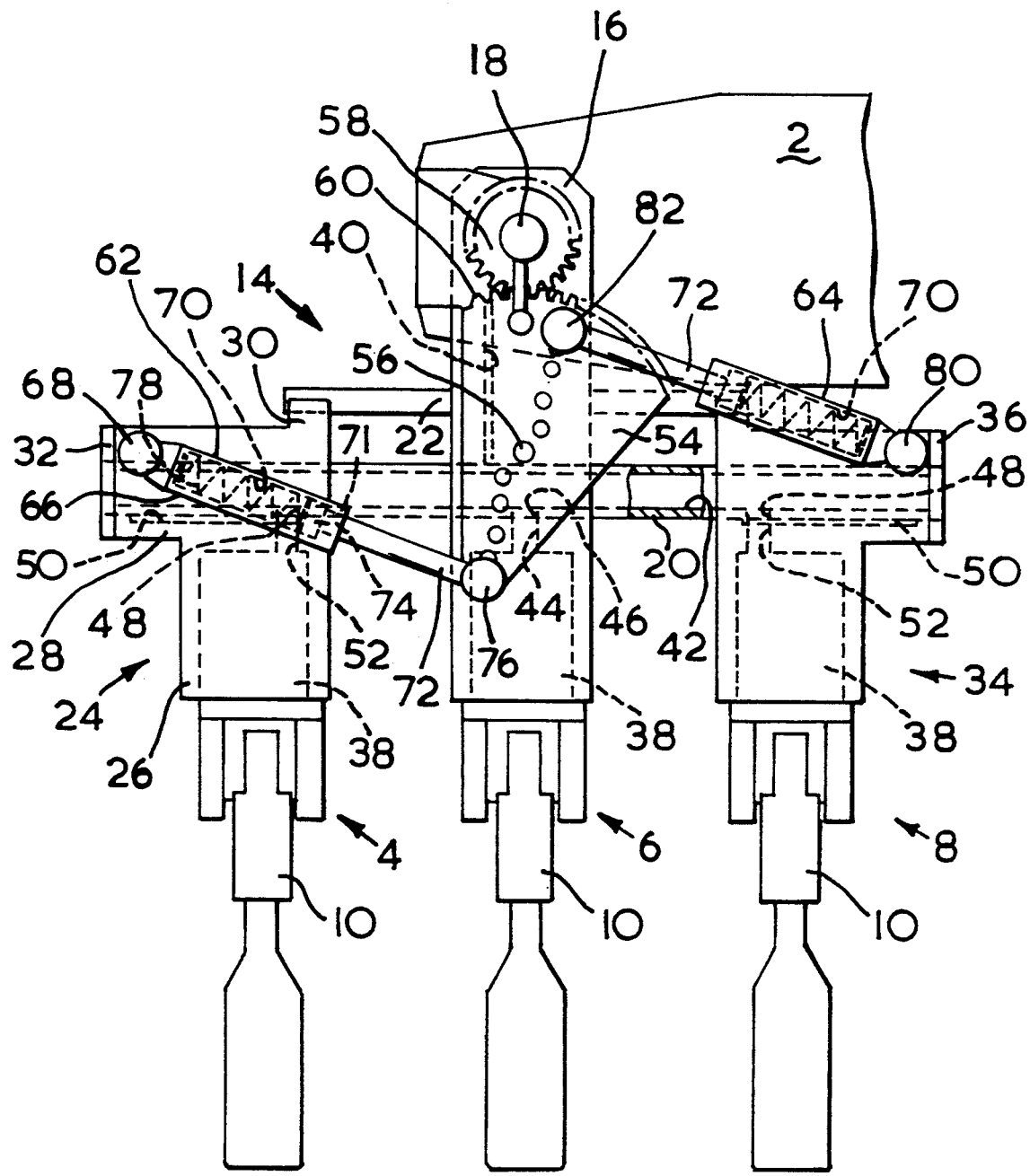

The take out device shown in the drawings is for use in a triple gob glassware forming machine and comprises three take out tongs 4, 6, 8 each comprising opposed tong fingers 10. The device is mounted on a transfer arm 2 of conventional construction which is so arranged that on movement of the arm 2 through an arc of 180° to carry the take out device from the pick up position (FIG. 1) through a top centre position (FIG. 2) to its deposit position (FIG. 3), the take out device is maintained in a horizontal orientation.

The take out tongs are mounted on a support 14 which comprises a central column 16, pivoted on the transfer arm 2 on a shaft 18, a transverse tube 20 secured to the column 16, and a transverse rod 22 also secured to the column 16.

The tong 4 is supported on a support member 24 which comprises a downward extension 26, on which the tong 4 is mounted, a central portion 28, which has a bore there through which is a slidable close fit about the tube 20, and an upward extension 30 which has a groove therein which fits closely about the rod 22. It will be seen therefore that the support member 24 is slidably mounted on the tube 20 for movement between an outermost (pickup) position shown in FIG. 1, and an innermost (deposit) position shown in FIG. 3. Inward movement of the support member 24 is determined by engagement of the member 24 with the column 16: outward movement of the support member 24 is determined by a head 32 of the tube 20.

Mounting of the tong 8 is similar to that of the tong 4, a support member 34 being slidably mounted on the tube 20 and having its outward movement determined by a head 36 of the tube 20.

The tong 6 is mounted on the column 16, and is thus fixed relative to the support 14.

Each of the support members 24 and 34 and the column 16 are provided with an air operated piston and cylinder device 38 (of conventional construction and not shown in detail) which causes opening and closing movement of the tongs 10. Air to operate the device 38 is supplied by way of the transfer arm 2 through an air passage 40 in the column 16 which leads to a central bore 42 of the tube 20 which is sealed at opposite ends by the heads 32, 36. The device 38 in the column 16 is provided with air through a passage 44 which leads to an opening 46 in the tube 20. The devices 38 in the support members 24 and 34 are provided with air through openings 48, 48 in the tube 20, grooves 50, 50, in the members 24 and 34 and passages 52, 52 leading from the grooves 50, 50 to the devices 38,38. It will thus be seen that the supply of air to the devices 38,38 in the support members 24 and 34 is maintained throughout sliding movement of the support member on the tube 20.

Figure 3:
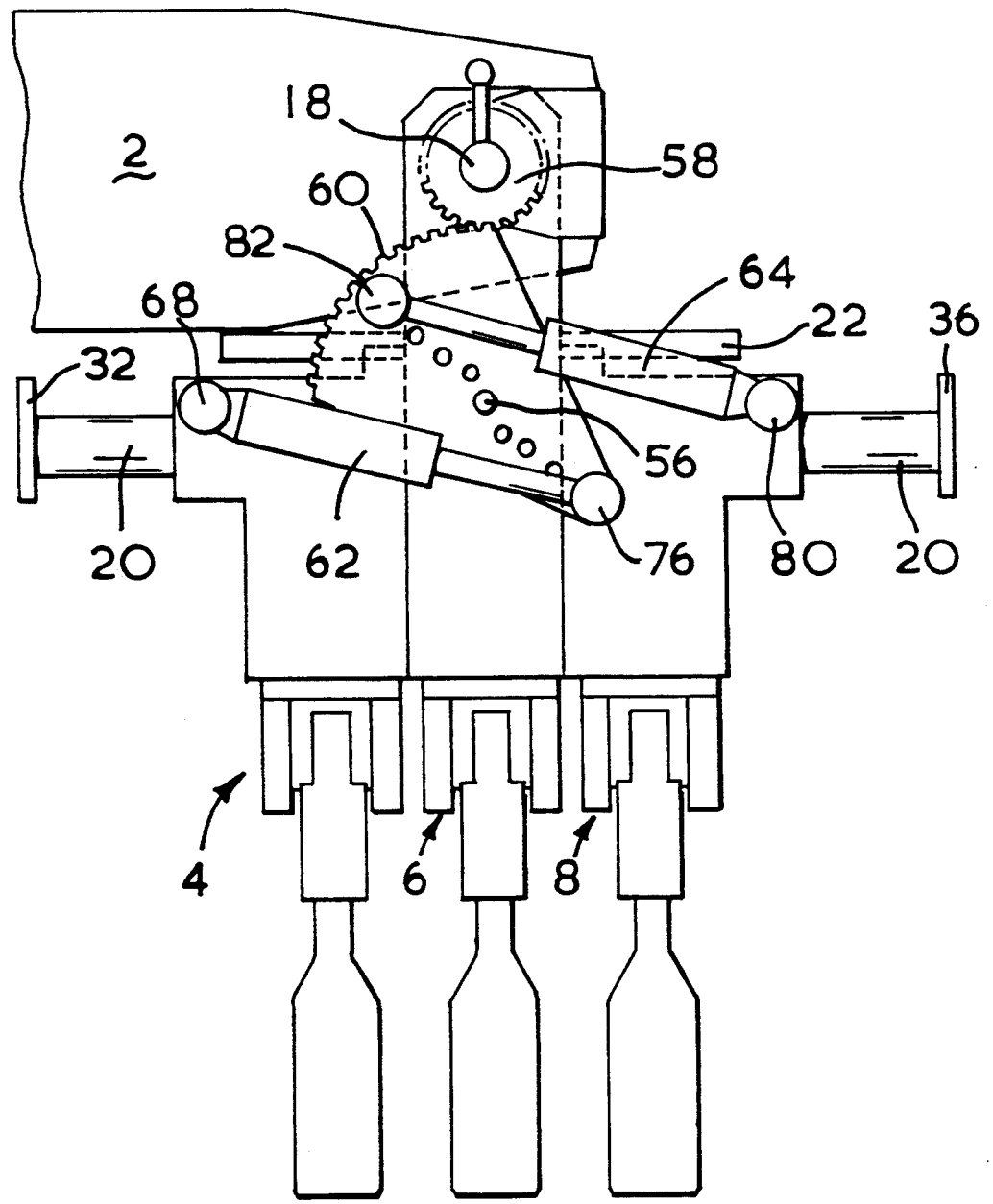
FIG. 3 shows the take out device in its deposit position in which it is about to deposit the containers on a dead plate.

The take out device comprises moving mechanisms arranged to move the movable tongs 4 and 8 between a spacing from the adjacent tong 6 appropriate to the spacing of the moulds when the tongs are in the pick up position (see FIG. 1) to a different spacing when the tongs are in the deposit position (see FIG. 3).

The moving mechanism comprises a gear segment 54 which is pivotally mounted at 56 on the central column 16 of the support 14. A pinion 58 is fixed in the transfer arm 2 in engagement with teeth 60 of the segment 54. On movement of the transfer arm 2 to carry the tongs between the pick up and the deposit positions, the pinion 58 causes the segment 54 to rotate about 56.

The support members 24, 34 of the tongs 4 and 8 are connected to the gear segment by links 62, 64 respectively.

The link 62 comprises a first link portion 66 which is pivoted to the member 24 by a pivot 68 and comprises a bore 70 opening at its outer end through a collar 71. A second link portion 72 comprises a head 74 which is slidably mounted in the bore 70, and is pivoted to the gear segment 54 by a pin 76. A spring 78 urges the two link portions 66 and 72 axially away from each other.

The link 64 is similarly constructed and extends between a pivot 80 on the support member 34 and a pivot pin 82 on the segment 54. The pivot pins 76 and 82 are symmetrically disposed about the pivot 56 of the gear segment.

Figure 2:
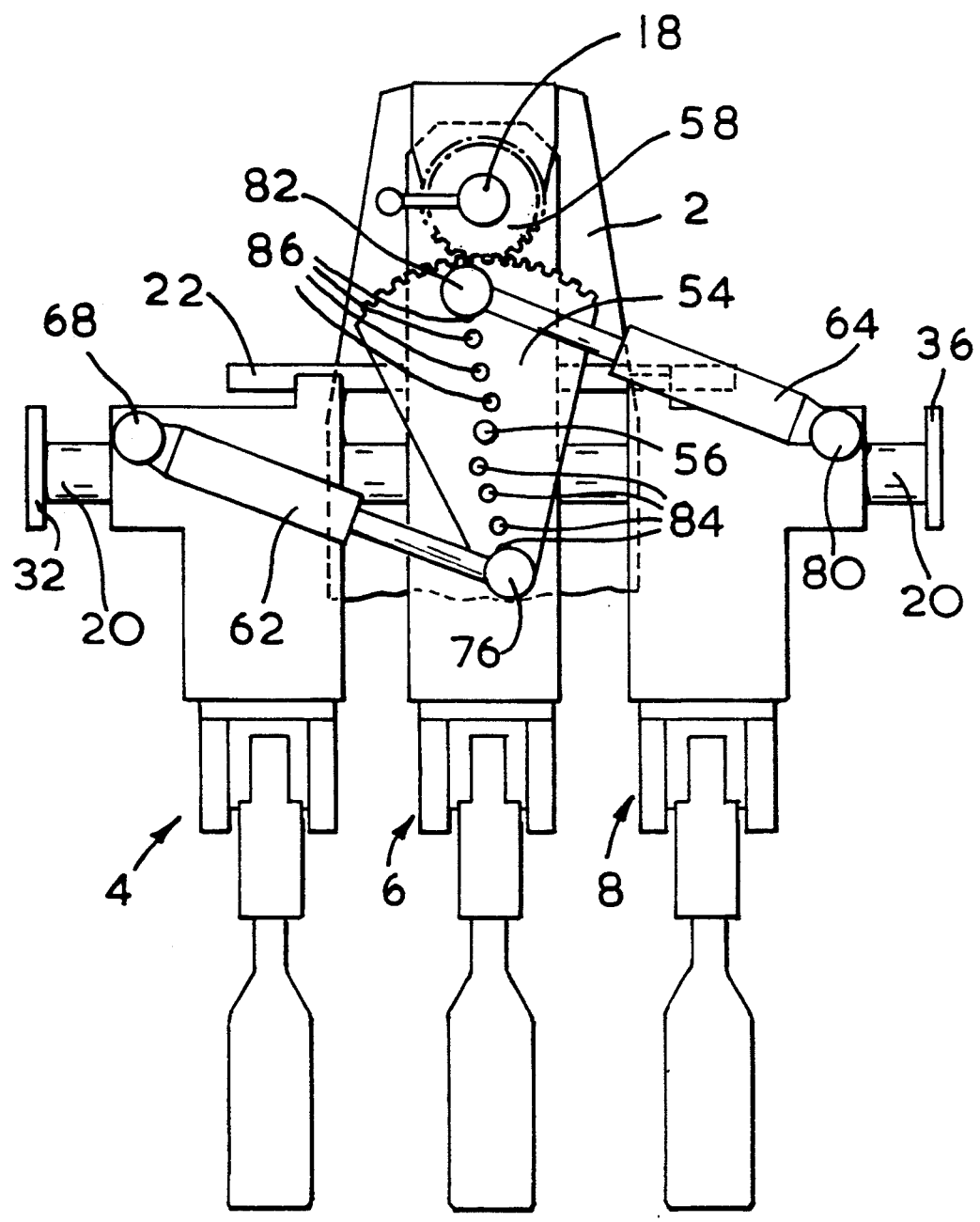
FIG. 2 shows the take out device as it moves through a top centre position.

It can thus be seen that on rotation of the gear segment 54 from its position shown in FIG. 1 to its position shown in FIG. 3, the head 74 engages the collar 71 and thus draws the support member 24 inwardly towards the central column 16, and the link 64 similarly draws the support member 34 towards the column. On rotation of the gear segment 54 in the reverse direction (from the position shown in FIG. 3 to that shown in FIG. 1 the support members are returned to their outward positions through pressure exerted by the springs in the link 62 and 64.

The amount of movement of the support members 24 and 34 can be adjusted. The gear segment 54 comprises a series of holes 84, 86. The holes 84 are arranged in an arc which is centered on the pivot 68 when the mechanism is in its FIG. 1 position, the holes 86 in an arc which is centered on the pivot 80. The links 62 and 64 may be pivoted in selected ones of these holes 84, 86 respectively, so that the outermost position of the members 24 and 34 is unchanged, while the innermost position of the member 24 and 34 will be varied with the members 24 and 34 spaced from the column 16 by different amounts according to which of the holes 84, 86 are selected.

It will be realized that if it is desired that the innermost position should be constant while the outermost position can be varied, this may be achieved by the provision of series of holes in the segment 54 which are centered in arcs about the pivots 68 and 80 when those pivots are in their FIG. 3 position.

While the preferred embodiment has been described with the spacing of the tongs greater at the pick up position than in the deposit position, the device can readily be modified so that the reverse is the case if required.

We claim:

1. A takeout device for picking up formed glass containers from blow molds of a glassware forming machine and depositing the picked up containers on a dead plate of the machine comprising first and second takeout tongs, a support, said first takeout tong secured to said support, means secured to said support for supporting said second takeout tong for displacement from a first position, defining a first spacing with said first takeout tong, to a second position, defining a second spacing with said first takeout tong, a pivotally displaceable transfer arm, a shaft secured to said transfer arm for supporting said support for rotation relative to said transfer arm, a pinion secured to said shaft, a gear segment pivotally secured to said support for rotation about an axis and in operative engagement with said pinion, a link having first and second ends, said link pivotally secured at said first end to said second takeout tong and pivotally secured at said second end to said gear segment at a first location spaced from said axis so that rotation of said transfer arm through a selected angle will conjointly rotate said gear segment and displace said link to move said second takeout tong from said first position to said second position.

2. A takeout device according to claim 1, further comprising a third takeout tong, means secured to said support for supporting said third takeout tong for displacement from a third position defining a third spacing with said first takeout tong to a fourth position defining a fourth spacing with said first takeout tong, and a second link having first and second ends, said second link pivotally secured at said first end to said third takeout tong and pivotally secured at said second end to said gear segment at second location diametrically opposed from said first location and said first and second locations equally spaced from said axis.

3. A takeout device according to claim 2, wherein each of said links comprises a housing, a rod having a piston at one end movable within said housing, and a compressed spring located within said housing urging said rod to a fully projecting location.

4. A takeout device according to claim 1 wherein said link comprises a housing, a rod having a piston at one end movable within said housing, and a compressed spring located within said housing urging said rod to a fully projecting location.

* * * * *